United States Patent
Lu et al.

(10) Patent No.: US 10,848,230 B2
(45) Date of Patent: Nov. 24, 2020

(54) RECOVERY FROM BEAM FAILURE

(71) Applicant: Telefonaktiebolaget LM Ericsson (Publ), Stockholm (SE)

(72) Inventors: Qianxi Lu, Beijing (CN); Rui Fan, Beijing (CN); Qingyu Miao, Beijing (CN); Zhang Zhang, Beijing (CN); Johan Rune, Lidingö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/746,608

(22) PCT Filed: Aug. 11, 2015

(86) PCT No.: PCT/CN2015/086611
§ 371 (c)(1),
(2) Date: Jan. 22, 2018

(87) PCT Pub. No.: WO2017/024516
PCT Pub. Date: Feb. 16, 2017

(65) Prior Publication Data
US 2018/0219604 A1 Aug. 2, 2018

(51) Int. Cl.
*H04B 7/06* (2006.01)
*H04B 7/08* (2006.01)
(Continued)

(52) U.S. Cl.
CPC .......... *H04B 7/0695* (2013.01); *H04B 7/088* (2013.01); *H04L 1/12* (2013.01); *H04L 1/1607* (2013.01);
(Continued)

(58) Field of Classification Search
CPC ......... H04B 7/0695; H04B 7/088; H04L 1/12; H04L 1/1607
See application file for complete search history.

(56) References Cited

U.S. PATENT DOCUMENTS

| | | | |
|---|---|---|---|
| 2004/0157611 A1* | 8/2004 | Smith | H04B 7/0695 455/445 |
| 2006/0098580 A1* | 5/2006 | Li | H04L 1/1671 370/245 |

(Continued)

FOREIGN PATENT DOCUMENTS

WO    2013039331 A2    3/2013

OTHER PUBLICATIONS

European Office Action issued in corresponding EP Application No. 15900714.5; dated Apr. 24, 2019; 08 Pages.

(Continued)

*Primary Examiner* — Jael M Ulysse
(74) *Attorney, Agent, or Firm* — Patent Portfolio Builders, PLLC

(57) ABSTRACT

The present invention generally relates to wireless communication, more particularly, relates to recovery from beam failure in a wireless access network where beamforming technique is used in communication between network elements. According to one aspect of the present invention, there is provided a method for recovery from beam failure in a wireless access network accessed by a user equipment (UE). The method comprises: at the wireless access network, determining whether the beam failure occurs on the basis of presence of a response from the UE during communicating between the wireless access network and the UE via a first beam; and if it is determined that the beam failure occurs, communicating with the UE via an available beam selected from the first beam and one or more second beams.

14 Claims, 5 Drawing Sheets

(51) Int. Cl.
    *H04L 1/12*                (2006.01)
    *H04L 1/16*                (2006.01)
    *H04W 74/08*              (2009.01)
    *H04W 74/00*              (2009.01)
    *H04W 36/06*              (2009.01)
    *H04W 72/04*              (2009.01)

(52) U.S. Cl.
    CPC ........ *H04W 74/0833* (2013.01); *H04W 36/06* (2013.01); *H04W 72/046* (2013.01); *H04W 74/002* (2013.01)

(56) References Cited

U.S. PATENT DOCUMENTS

| | | | |
|---|---|---|---|
| 2006/0171357 A1* | 8/2006 | King | H04W 72/046 370/331 |
| 2007/0036353 A1* | 2/2007 | Reznik | H04L 63/18 380/30 |
| 2010/0041392 A1* | 2/2010 | Hirata | H04W 24/04 455/425 |
| 2010/0159845 A1* | 6/2010 | Kaaja | H04B 7/088 455/70 |
| 2010/0267341 A1* | 10/2010 | Bergel | H04B 7/0639 455/63.1 |
| 2011/0110453 A1* | 5/2011 | Prasad | H04B 7/088 375/285 |
| 2012/0208581 A1* | 8/2012 | Ishida | H04L 5/0023 455/509 |
| 2012/0220239 A1* | 8/2012 | Hosoya | H04B 7/0617 455/63.4 |
| 2013/0039345 A1* | 2/2013 | Kim | H04W 72/042 370/332 |
| 2013/0065622 A1* | 3/2013 | Hwang | H04W 16/28 455/500 |
| 2013/0258885 A1* | 10/2013 | Yu | H04L 1/188 370/252 |
| 2014/0010178 A1* | 1/2014 | Yu | H04W 74/0833 370/329 |
| 2014/0051351 A1* | 2/2014 | Jia | H04B 7/0617 455/39 |
| 2014/0177607 A1* | 6/2014 | Li | H04W 52/42 370/336 |
| 2014/0233516 A1* | 8/2014 | Chun | H04W 74/0833 370/329 |
| 2014/0376466 A1* | 12/2014 | Jeong | H04B 7/0695 370/329 |
| 2015/0215077 A1* | 7/2015 | Ratasuk | H04B 7/088 455/436 |
| 2015/0223222 A1 | 8/2015 | Irie et al. | |
| 2015/0244478 A1* | 8/2015 | Shirakata | H04L 1/203 370/252 |
| 2015/0341095 A1* | 11/2015 | Yu | H04B 7/061 370/252 |
| 2016/0087877 A1* | 3/2016 | Ryu | H04L 45/22 370/329 |
| 2017/0033904 A1* | 2/2017 | Stirling-Gallacher | H04L 5/0023 |

OTHER PUBLICATIONS

Office Action issued in corresponding EP Application No. 15900714.5 dated Dec. 19, 2019, 09 Pages. The references not cited herein have previously been made of record.

\* cited by examiner

RECOVERY FROM BEAM FAILURE

TECHNICAL FIELD

The present invention generally relates to wireless communication, more particularly, relates to recovery from beam failure in a wireless access network where beamforming technique is used in communication between network elements.

BACKGROUND

The ultimate goal of mobile broadband should be the ubiquitous and sustainable provision of non-limiting data rates to everyone and everything at every time. Along this path, Ultra-Dense Network (UDN) is an important next step following the successful introduction of LTE for wide-area and local-area access.

Ultra-dense network (UDN) is envisioned to provide ubiquitous mobile broadband with access-node densities considerably higher than the current densest cellular networks. UDN can be deployed in areas with high traffic consumption. Through overprovision and related low average loads in an access network, UDN creates ubiquitous access opportunities which—even under realistic assumptions on user density and traffic—provide users with the desired data rates.

Overprovisioning is achieved by an extremely dense grid of access nodes; inter-access-node distances in the order of tens of meters and below are envisioned. For in-indoor deployments, one or even multiple access nodes are conceivable in each room. Additionally, in order to increase network capacity, densification—via reduced transmit powers—also offers access to vast spectrum holdings in the millimeter-wave bands and thus higher data rates.

Beamforming for concentrating transmitted energy on an intended receiver plays a critical role for UDN. However, using more narrow transmission beams also makes a wireless system more susceptible to sudden coverage loss due to beam failure. In light of the above, an efficient and reliable recovery from the beam failure constitutes an urgent issue to be addressed.

SUMMARY OF THE INVENTION

According to one aspect of the present invention, there is provided a method for recovery from beam failure in a wireless access network accessed by a user equipment (UE). The method comprises: at the wireless access network, determining whether the beam failure occurs on the basis of presence of a response from the UE during communication between the wireless access network and the UE via a first beam; and if it is determined that the beam failure occurs, communicating with the UE via an available beam selected from the first beam and one or more second beams.

According to the above aspect of the present invention, the beam failure can be effectively detected by a feedback-based determination without always-on reference signal. This is especially advantageous for a UE specific beam-based system such as UDN.

In an embodiment according to the present invention, the response is one selected from a group consisting of: an acknowledgement (ACK) message or a negative acknowledgement (NACK) message responding to a data message transmitted from an AN of the wireless access network on a downlink associated with the first beam, and a data message responding to a grant message transmitted from an AN of the wireless access network on a downlink associated with the first beam.

In an embodiment according to the present invention, the selection of the available beam is on the basis of radio link quality for downlinks associated with the first beam and the one or more second beams.

In an embodiment according to the present invention, the step of communicating with the UE via the available beam comprises: upon determining that the beam failure occurs, transmitting to the UE a message from one or more ANs of the wireless access network via the first beam and the one or more second beams; receiving information on the selection of the available beam from the UE; and using the selected available beam during communication with the UE.

In an embodiment according to the present invention, the step of communicating with the UE via the available beam comprises: upon determining that the beam failure occurs, transmitting to the UE a message from a first AN and a second AN of the wireless access network, wherein the message from the first AN is transmitted via the first beam and the message from the second AN is transmitted via the one or more second beams; receiving information on the selection of the available beam from the UE; and using the selected available beam during communication with the UE.

In an embodiment according to the present invention, the step of communicating with the UE via the available beam comprises: upon determining that the beam failure occurs, transmitting a message from a first AN and second AN of the wireless access network, wherein the message from the first AN is transmitted via the first beam and at least one of the second beams and the message from the second AN is transmitted via the other of the second beams; receiving information on the selection of the available beam from the UE; and using the selected available beam during communication with the UE.

According to another aspect of the present invention, there is provided a method for recovery from beam failure for a user equipment (UE) accessing a wireless access network. The method comprises: at the UE, determining whether the beam failure occurs on the basis of presence of a response from the wireless access network during communication between the wireless access network and the UE via a first beam; and if it is determined that the beam failure occurs, communicating with the wireless access network via an available beam selected from the first beam and one or more second beams.

In an embodiment according to the present invention, the response is one selected from a group consisting of: a grant message responding to a service request transmitted from the UE on an uplink associated with the first beam and a random access response message responding to a random access request transmitted from the UE on an uplink associated with the first beam.

In an embodiment according to the present invention, the selection of the available beam is on the basis of radio link quality for uplinks associated with the first beam and the one or more second beams.

In an embodiment according to the present invention, the step of communicating with the wireless access network via the available beam comprises: upon determining that the beam failure occurs, transmitting to one or more ANs of the wireless access network a message from the UE via the first beam and the one or more second beams; receiving information on the selection of the available beam from the one or more ANs of the wireless access network; and using the selected available beam during communication with the wireless access network.

According to another aspect of the present invention, there is provided an access node (AN) capable of communicating with a user equipment (UE). The AN is configured to: determine whether beam failure occurs on the basis of presence of a response from the UE during communication between the AN and the UE via a first beam; and if it is determined that the beam failure occurs, communicate with the UE via an available beam selected from the first beam and one or more second beams, or transfer to another AN communication with the UE, the communication being made via the available beam.

According to another aspect of the present invention, there is provided a user equipment (UE) capable of communicating with a wireless access network. The UE is configured to: determine whether the beam failure occurs on the basis of presence of a response from the wireless access network during communication between the wireless access network and the UE via a first beam; and if it is determined that the beam failure occurs, communicate with the wireless access network via an available beam selected from the first beam and one or more second beams.

According to another aspect of the present invention, there is provided a user equipment (UE) capable of interacting with a wireless access network. The UE comprises: a determining unit configured to determine whether the beam failure occurs on the basis of presence of a response from the wireless access network during communication between the wireless access network and the UE via a first beam; and a transceiver configured to communicate with the wireless access network via an available beam selected from the first beam and one or more second beams if the determining unit determines that the beam failure occurs.

In an embodiment according to the present invention, for communicating with the wireless access network via the available beam, the transceiver is configured to: transmit to one or more ANs of the wireless access network a message from the UE via the first beam and the one or more second beams if the determining unit determines that the beam failure occurs; receive information on the selection of the available beam from the one or more ANs of the wireless access network; and use the selected available beam to communicate with the wireless access network.

According to another aspect of the present invention, there is provided an access node (AN) capable of communicating with a user equipment (UE). The AN comprises: a determining unit configured to determine whether beam failure occurs on the basis of presence of a response from the UE during communication between the AN and the UE via a first beam; and a transceiver configured to, if the determining unit determines that the beam failure occurs, communicate with the UE via an available beam selected from the first beam and one or more second beams, or transfer to another AN communication with the UE, the communication being made via the available beam.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION

Figure 1:
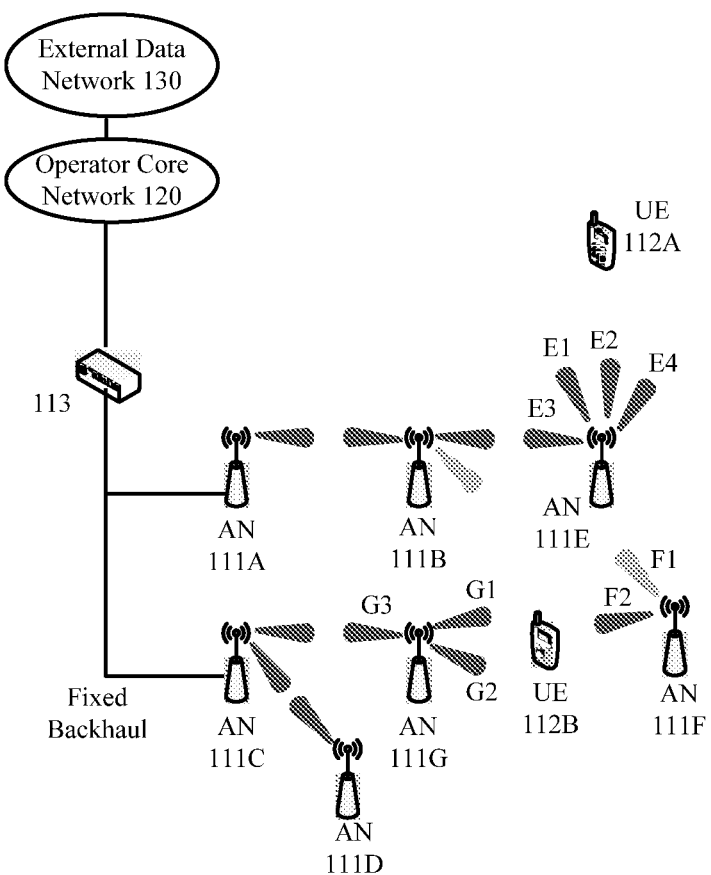
FIG. 1 is a schematic diagram depicting an Ultra-dense network (UDN) architecture.

The principles and operation of the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of being implemented by other embodiments or of being practiced or carried out in various ways. Also, it is to be understood that the phraseology and terminology employed herein is for the purpose of description and should not be regarded as limiting.

All references to "a/an/the element, apparatus, component, means, step, etc." are to be interpreted as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

Generally, all terms used in the claims and the description are to be interpreted according to their ordinary meaning in the technical field, unless explicitly defined otherwise herein. For example, the term "user equipment (UE)" may refer to any suitable terminal capable of wireless communication, such as a mobile phone or a portable computer. Likewise, the term "access node (AN)" may refer to any suitable intermediary devices providing wireless communication, such as a relay node, a router, an access point, a base station or a base site, which is capable of connecting a user equipment to another wireless access node or connecting a user equipment to a core network. The term "wireless link" or "radio link" may refer to a radio channel connecting wireless communication devices such as UEs and ANs with each other, and thus may refer to anyone of an uplink (UL), a downlink (DL), a forward link (FL) and a reverse link (RL).

Beamforming is a signal processing technique used for directional signal transmission or reception. Beamforming can be used at both transmitting and receiving sides in order to achieve spatial selectivity. In a typical beamforming configuration, a transmitter with an antenna array amplifies a signal by different "weights" at the respective antennas, and thus the signal experiences constructive interference at particular directions or sectors and destructive interference at other directions or sectors. As a result, it can have a desired sensitivity pattern where a main lobe, serving as a beam for transmitting the signal to a receiver, is produced together with nulls and side lobes. By adjusting the main lobe width and the side lobe levels, the position of a null can be controlled. This is useful to ignore noise or jammers in one particular direction, while listening for events in other directions. A similar result can be obtained on reception. The details on beamforming are described in, e.g., IEEE 802.11ad, which is incorporated herein by reference in its entirety.

Beam failure, as discussed throughout the present disclosure, refers to such a situation where a beam currently being used for communication between a transceiver and a receiver becomes unavailable due to e.g., deteriorative radio link quality. A variety of events such as UE mobility, appearance of obstacle and orientation change for a UE may deteriorate the radio link quality.

FIG. 1 is a schematic diagram depicting an Ultra-dense network (UDN) architecture. Referring to FIG. 1, a wireless network, e.g., UDN 110 herein, comprises ANs 111A-111G, which are configured to provide UEs 112A-112B with wireless access within their respective coverages by beamforming technique. For illustrative purpose, UEs 112A and 112B are communicatively coupled to ANs 111E and 111G, respectively. On the other hand, ANs 111A-111G are communicatively coupled with each other. In particular, as shown in FIG. 1, ANs 111A and 111C are connected together via a fixed backhaul link, and other ANs 111B, 111D-111G are connected to AN 111A or 111C via wireless links. As a result, ANs 111A-111G are either directly connected to fixed transport backhaul or wirelessly backhauled by other ANs. Moreover, these ANs are coupled to a transport aggregation node 113, over which they can communicate with an operator core network 120 or an external data network 130, e.g., internet.

As stated above, it has a correlation between the beam failure and the deteriorated radio link quality. Therefore, one can determine whether the beam failure occurs on the basis of the radio link quality. However, this heavily relies on an always-on common reference signal on uplinks or downlinks and thus is not attainable for a typical UDN radio access configuration where beamforming is used widely to compensate the limited link budget in high-frequency spectrum and thus transmission is UE specific rather than UE common, i.e., reference signals are transmitted only when a UE is expected to receive them.

According to one aspect of the present invention, a transmitter utilizes a feedback or response from a receiver to determine the occurrence of the beam failure. For example, in the UDN as shown FIG. 1, assuming that AN 111E and UE 112A communicate with each other via beam E1. In a session, AN 111E transmits, to UE 112A, a data message via beam E1 and then waits for an acknowledgement (ACK) message or a negative acknowledgement (NACK) message from UE 112A. If AN 111E receives neither the ACK message nor the NACK message via beam E1 within a predetermined time interval, it will determine the occurrence of the beam failure for beam E1. As another example, UE 112A transmits a service request to AN 111E via beam E1 and then waits for a grant message from AN 111E. If UE 112A fails to receive the grant message via beam E1 within a predetermined time interval, it will determine the occurrence of the beam failure for beam E1.

It shall be noted that the feedback-based determination as described above is also applicable to other message types. For example, at AN side, the determination may be established on a data message responding to a grant message transmitted from AN 111E; and at UE side, one can make the determination on the basis of a random access response message responding to a random access request transmitted from UE 112A.

With the feedback-based determination, the always-on reference signal is not necessary and thus the beam failure can be effectively detected in a UE specific beam-based system such as UDN.

Typically, for communication between a UE and a wireless access network, two or more beams are available and one of them may be selected for serving the communication. For example, in the UDN as shown in FIG. 1, UE 112A and AN 111E can communicate with each other via beams E1, E2, and E4. These beams are collectively referred to be "candidate beam" hereinafter. Among the candidate beams, one currently serving the communication or interaction is referred to as "serving beam" or "first beam" hereinafter; and other candidate beam(s) are referred to as "backup beam" or "second beam" hereinafter. One way to recover from beam failure is to use one of the backup beams to take over the coverage in case of the sudden beam loss of the serving beam. Note that the candidate beams are unnecessarily limited to only a pair of a UE and a specific AN. As described below, for the candidate beams, some of them may belong to the UE and one AN and the others may belong to the UE and another AN.

According to another aspect of the present invention, a UE (UE side) and a wireless access network (network side) reach pre-agreement on which beams qualify as the backup beams for a serving beam. The pre-agreement may be periodically carried out between these participators, or carried out at the beginning of establishing connection between them. In one embodiment, the UE side or the network side as a transmitter side (Tx side), transmits to the network side or the UE side as a receiver side (Rx side) a reference signal in different directions or via different beams associated with uplinks or downlinks. The receiver side reports the beam(s) via which the reference signal is received, preferably along with radio link quality associated with them. Therefore, for each beam being as a serving beam, one or more backup beams are identified by the participators. For example, assuming the Tx side transmits the reference signal to the Rx side via beams X1, . . . Xn, wherein n represents the number of the transmitting beams. If the Rx side receives the reference signal via beams X1, X3 and Xi, beams X3 and Xi are identified as the backup beams for beam X1, beams X1 and Xi are identified as the backup beams for beam X3, and beams X1 and X3 are identified as the backup beams for beam Xi.

Preferably, in case of a plurality of backup beams for a serving beam, one is designated as a primary backup beam, which will be firstly selected as a new serving beam if the beam failure occurs. More preferably, the designation is made at the receiver side and is based on the radio link quality of the forward links associated with the backup beams. The radio link quality may be obtained from RSRP or SINR measurements at the receiver side. More preferably, the primary backup beam corresponds to one forward link having the best radio link quality.

In case of the network or AN side being as the transmitter side, the designation is made at the UE side. Since the network side does not dominate the designation of the primary backup beam associated with the downlink, it takes a risk that no radio resources are available when the beam failure occurs or the utilization of radio resources is not optimum. In one embodiment, the designation is always dominated at the network side so as to avoid the above defects. Particularly, the network side designates the primary backup beam based on, e.g., the radio link quality measurement made by the UE side and the current load distribution around the UE side. In one embodiment, the network side indicates the primary backup beam in each downlink transmission, e.g., as additional information in a Scheduling Assignment (SA) or as a MAC Control Element (MAC CE) in a MAC Protocol Data Unit (MAC PDU) carrying data. Alternatively, the network side may send a separate indicator on the primary backup beams by using a MAC CE, e.g., in a MAC PDU without higher layer data, or Radio Resources Control (RRC) signaling. In another embodiment, the primary backup beam is determined in a hybrid mode. As described above, the pre-agreement is periodically carried out between a UE side and a network side. At the beginning of the current pre-agreement cycle, the UE side, being as a receiver side, designates the backup beam corresponding to one forward link having the best radio link quality as the primary backup beam. However, the designation is changeable by the network side during the current pre-agreement cycle. For example, the network side may send a command for changing the primary backup beam in a downlink transmission, either in conjunction with data transmission or as a separate signaling message. Alternatively, the changed primary backup beam is valid until the next sending of the command. In other words, whatever measurements for radio link quality vary from one cycle to another cycle, the primary backup beam will be kept unchanged until the network side sends the command again.

According to another aspect of the present invention, the identified backup beams are mapped into specific downlink and uplink resources. The specific uplink resources may be UL PHY resources, e.g., random access channel resources or scheduling request resources, and the specific downlink resources may be DL PHY resources, e.g., downlink control channel resources according to a Discontinuous Reception (DRX) pattern.

As a result, a transmitter side (e.g., network or AN side in case of DL and UE side in case of UL) will notify the occurrence of beam failure for a serving beam via both of the current serving beam and the backup beam(s), or only via the backup beam(s), and a receiver side (e.g., network side in case of UL and UE side in case of DL) will recognize the beam failure by monitoring the mapped radio link resources. For UL, the AN side is ready for uplink reception on the mapped resources associated with the backup beams. If the AN side receives a request for transmission resources through a Scheduling Request (SR), e.g., on Physical Downlink Control Channel (PDCCH) resources or through a random access procedure initiated on a Random Access Channel (RACH) mapped to the resources associated with one of the backup beams, it recognizes that this backup beam is in use for the reselection of the serving beam. On the other hand, for DL, the UE side is ready for downlink reception on the mapped resources associated with the backup beams. If the UE receives SA on PDCCH of the mapped downlink resources associated with one of the backup beam, it recognizes that this backup beam is in use for the reselection of the serving beam.

According to another aspect of the present invention, if, at the transmitter side, e.g., at the network or UE side, it determines that the beam failure for the current serving beam occurs, a new serving beam needs to be reselected from the candidate beams, including the current serving beam and the backup beam(s), or only from the backup beam(s). Note that at this time, it has no knowledge on which link (forward link, reverse link, or both) causes the beam failure. Therefore, a transmitter will notify a receiver of the occurrence of the beam failure via the current serving beam and the backup beam(s), or only via the backup beam(s). The notification may be transmitted in a forward link transmission, either in conjunction with data transmission or as a separate signaling message. Note that the explicit notification is unnecessary and the receiver side can recognize the beam failure only from the event that the data transmission is performed via the backup beam(s). At the receiver side, e.g., the network side or UE side, it monitors the forward links associated with the candidate beams. Upon receiving the notification or the data transmission via the backup beams, the receiver side utilizes an available beam as a new serving beam to communicate with the transmitter side. The available beam is selected from the serving beam and the backup beam(s), or only from the backup beam(s).

In one embodiment, the selection is made on the basis of the radio link quality. For example, assuming the transmitter side transmits the notification or the data transmission via beams X1, X2, X3 and X4, and at the receiver side, the notification or the data transmission is received via beams X1, X2 and X3. If the forward link associated with beam X2 has the highest link quality, beam X2 is selected as the new serving beam.

Alternatively, in case of the receiver side being the UE side, the new serving beam is selected by the network side. Particularly, upon receiving the notification or the data transmission via beams X1, X2 and X3, the receiver reports the radio link quality for the forward links. Then, at the transmitter, the new serving beam is selected on the basis of the radio link quality measurement made by the UE side and the current load distribution around the UE side.

Preferably, upon receiving the notification or the data transmission via beams X1, X2 and X3, the receiver reports to the transmitter the receipt of the notification or the data transmission via beams X1, X2 and X3. Then, in response to the report from the receiver, the transmitter selects the new serving beam on the basis of the radio link quality for the reverse links associated with beams X1, X2 and X3, and optionally along with the current load distribution around the UE side. In another embodiment, the new serving beam may be the primary backup beam designated in the manner as described above.

As a result, the communication continues between the transmitter side and the receiver side via the new serving beam. The new serving beam may be the serving beam previously in use or a backup beam.

Figure 2:
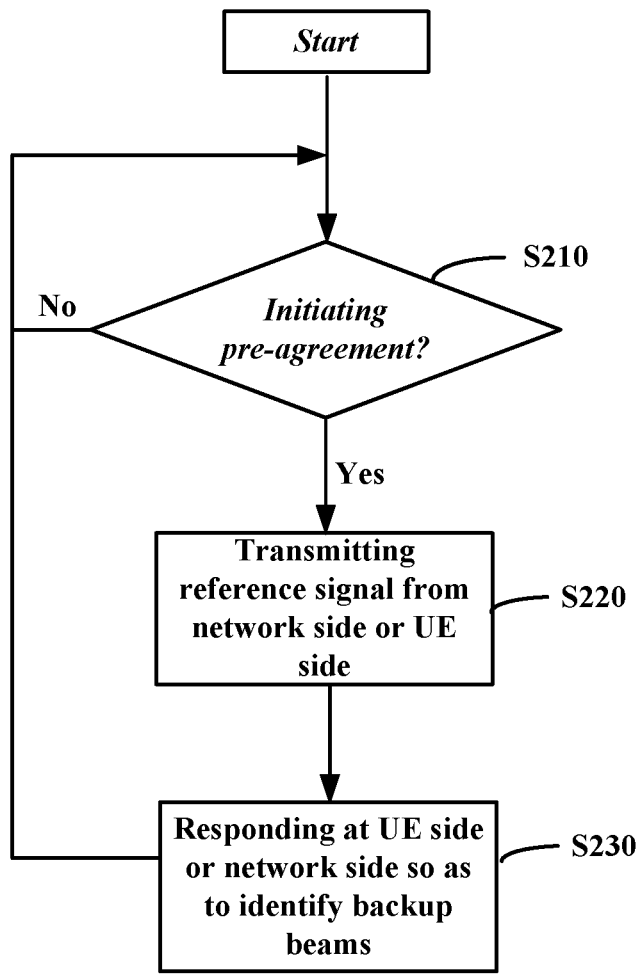
FIG. 2 is a process flow diagram of a method for reaching pre-agreement on backup beam(s) according to one exemplary embodiment of the present invention.

FIG. 2 is a process flow diagram of a method for reaching pre-agreement on backup beam(s) according to one exemplary embodiment of the present invention. For illustrative purpose, the following depiction is made in the context of the above architecture as shown in FIG. 1. However, one skilled artisan in the art would recognize that the present invention is applicable to other architectures. Moreover, one skilled artisan will recognize that all of the aspects of the present invention as described above are applicable to the present exemplary embodiment.

With reference to FIG. 2, at step S210, it determines whether a routine for reaching pre-agreement on backup beams for the current serving beams shall be initiated. Note that the routine may be triggered periodically or by the occurrence of a predefined event, e.g., establishment of connection between UE 112A and AN 111E. If the routine shall be initiated, the process proceeds to step S220; otherwise, the process continues to determine whether the routine shall be initiated at step S210.

At step S220, the routine for reaching pre-agreement on backup beams for the current serving beam is initiated. The initiator for the routine may be either UE 112A or AN 111E. For example, as an initiator, AN 111E initiates the routine by transmitting, to UE 112A, a reference signal via beams E1, E2, E3, and E4 associated with downlinks.

Assuming UE 112A receives the reference signal via downlinks associated with beams E1, E2 and E4. Thus, at step S230, UE112A will respond to AN 111E via uplinks associated with beams E1, E2 and E4. Preferably, the response to AN 111E may include radio link quality for the downlinks associated with these beams. As a result, the participants will identify backup beams for each beam. In particular, beams E2 and E4 are identified as the backup beams for beam E1, beams E1 and E4 as the backup beams for beam E2, and beams E1 and E2 as the backup beams for beam E4. The identified backup beams are mapped into specific downlink and uplink resources and thus the receiver side can recognize the beam failure by monitoring the mapped specific radio link resources.

At UE 112A, one of beams E2 and E4 may be designated as a primary backup beam based on the radio link quality of the downlinks associated with these backup beams. Alternatively, the designation is performed by AN 111E on the basis of the radio link quality and the current load distribution around UE 112A.

After step S230, the process proceeds to step S210.

Figure 3:
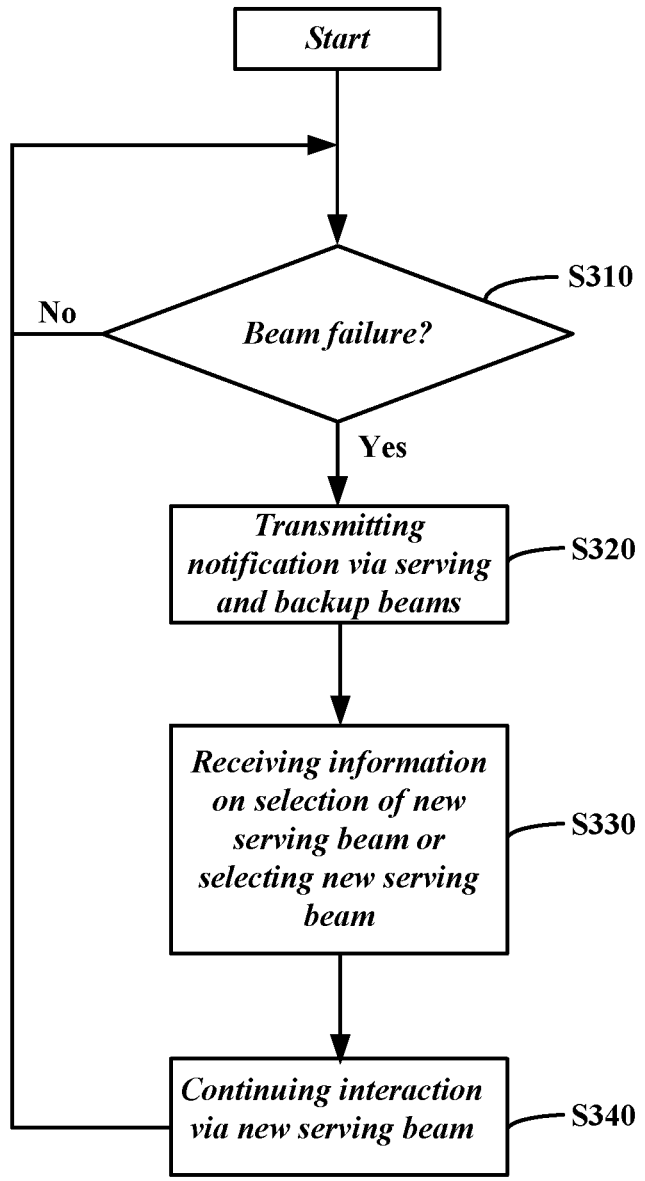
FIG. 3 is a process flow diagram of a method for recovery from beam failure in a wireless access network according to another exemplary embodiment of the present invention.

FIG. 3 is a process flow diagram of a method for recovery from beam failure in a wireless access network according to another exemplary embodiment of the present invention. For illustrative purpose, the following depiction is made in the context of the above architecture as shown in FIG. 1. However, one skilled artisan in the art would recognize that the present invention is applicable to other architectures. Moreover, one skilled artisan will recognize that all of the aspects of the present invention as described above are applicable to the present exemplary embodiment.

For illustrative purpose, in the present exemplary embodiment, it assumes that UE 112A accesses to UDN 110 through AN 111E via beam E1, which is taken as the current serving beam at the beginning of the process, and under pre-agreement, beams E2 and E4 are taken as the backup beams for beam E1.

At step S310, UE 112A or AN 111E determines whether beam failure for the current serving beam, i.e., beam E1, occurs. The determination may be the feedback-based determination as described above. In particular, UE 112A or AN 111E may utilize a feedback or response from a receiver to determine the occurrence of the beam failure. If it determines the beam failure occurs, the process proceeds to step S320; otherwise, the process continues to determine whether the beam failure occurs at step S310.

For illustrative purpose, it assumes that the beam failure is determined at AN 111E. Then at step S320, AN 111E transmits notification of the occurrence of the beam failure to UE 112A via the current serving beam E1 and the backup beams E2 and E4. Alternatively, the notification may be transmitted only via the backup beams E2 and E4. Likewise, the notification may be transmitted either in conjunction with data transmission or as a separate signaling message.

As described above, upon receiving the notification or the data transmission via the backup beams, the receiver side utilizes an available beam as a new serving beam to communicate with the transmitter side. The available beam is selected from the serving beam and the backup beams, or only from the backup beams. Therefore, at step S330, AN 111E receives from UE 112A information on the selection of the available beam or the new serving beam. For illustrative purpose, assuming beam E4 is selected as the new serving beam.

Alternatively, instead of selecting a new serving beam, the receiver side may send to the transmitter side a report on the beams via which the notification or the data transmission is received. For example, it assumes that the notification or the data transmission is received via beams E1 and E4 at the receiver side. Thus, it will be reported that the notification or the data transmission is received via beams E1 and E4. Accordingly, at step S330, upon receiving the report from the receiver side, the transmitter side selects a new serving beam based on the radio link quality for the forward links associated with the reported beams, i.e., beams E1 and E4. For illustrative purpose, assuming that the forward link associated with beam E4 has the best radio link quality, as a result, beam E4 is selected as the new serving beam at the transmitter side.

At step S340, AN 111E continues the interaction or communication with UE 112A via beam E4 and then returns to step S310.

In case the beam failure is determined at UE 112A, UE 112A transmits notification of the occurrence of the beam failure to AN 111E via beams E1, E2, and E4 or only via beams E2 and E4 at step S320. Then at step S330, UE 112A receives from AN 111E information on the selection of the available beam or the new serving beam. The process proceeds to step S340, where UE 112A continues the communication with AN 111E via beam E4 and then returns to step S310.

In the above embodiments, it assumes that the backup beams belong to the same AN. However, this assumption is not necessary and the present invention may be extended to such a scenario where, for a serving beam, some or all of the backup beams belong to an AN different from the AN of the serving beam. For example, as shown in FIG. 1, UE 112B can access to AN 111G via beams G1 or G2, or to AN 111F via beam F2. Therefore, for serving beam G1(G2), besides backup beam G2(G1) in AN 111G, beam F2 in AN 111F can be also used as a backup beam; likewise, for serving beam F2, beams G1 and G2 can be used as backup beams. The above configuration enhances recovery capability from beam failure, especially when all of the beams within an AN are unavailable.

In case the backup beams involve with multiple ANs, it is advantageous to introduce inter-AN coordination between the involved ANs in the pre-agreement on the backup beams and the selection of the new serving beam. Preferably, the inter-AN coordination is performed via an intermediate node, e.g., a control node acting as a cluster head for controlling a cluster comprising the involved ANs. Alternatively, the inter-AN coordination may be performed directly between the involved ANs.

Figure 4:
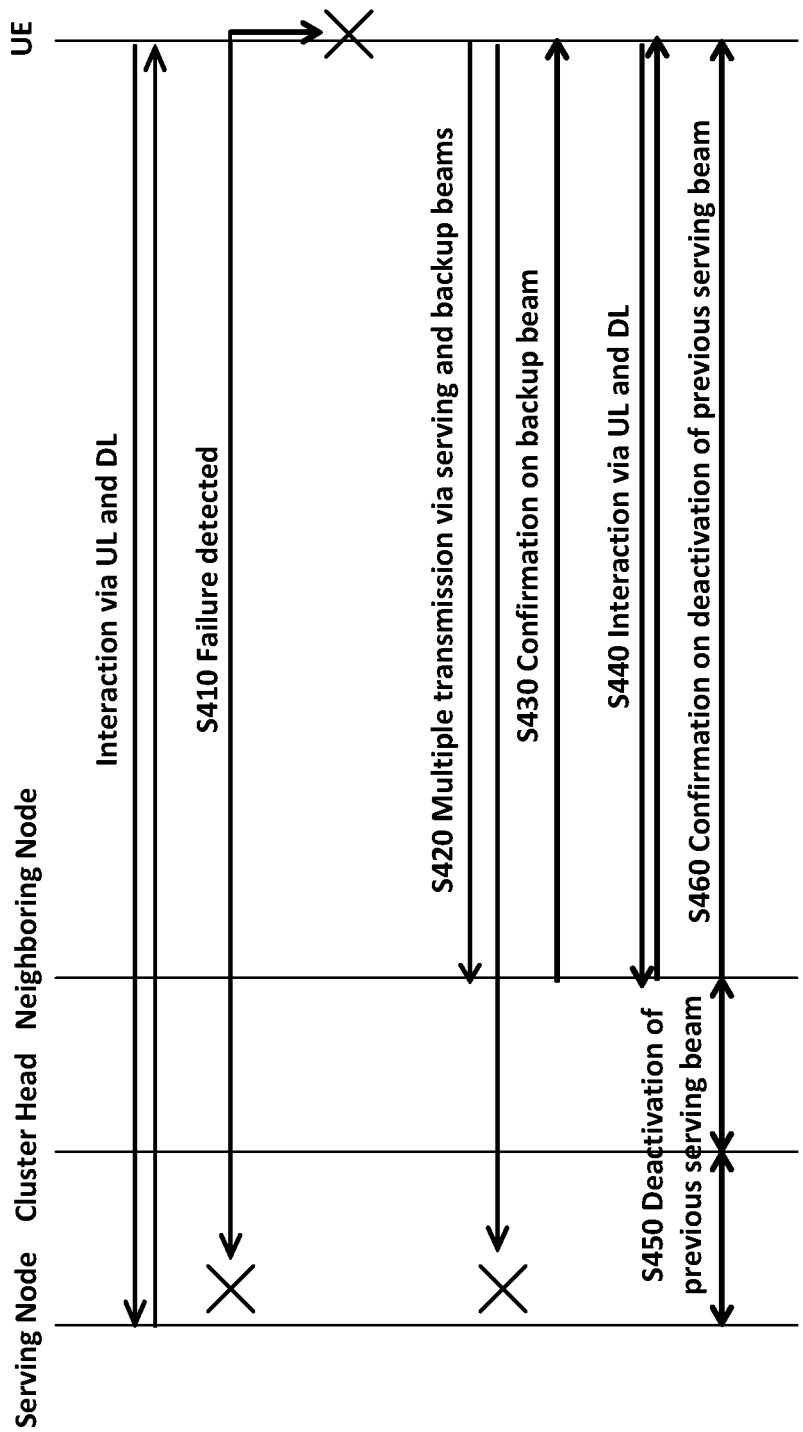
FIG. 4 is a process flow diagram of a method for recovery from beam failure in a wireless access network according to another exemplary embodiment of the present invention.

FIG. 4 is a process flow diagram of a method for recovery from beam failure in a wireless access network according to another exemplary embodiment of the present invention. For illustrative purpose, the following depiction is made in the context of the above architecture as shown in FIG. 1. However, one skilled artisan in the art would recognize that the present invention is applicable to other architectures. Moreover, one skilled artisan will recognize that all of the aspects of the present invention as described above are applicable to the present exemplary embodiment.

For illustrative purpose, in the present exemplary embodiment, it assumes that UE 112B access to UDN 110 through AN 111G (referred to be "serving node" hereinafter) via beam G1, which is taken as the current serving beam at the beginning of the process, and between AN 111G, AN 111F (referring to as "neighboring node" hereinafter) and UE 112B, it reaches pre-agreement that beams G2 and F2 are backup beams for beam G1. As described above, an intermediate node such as a cluster head, e.g., transport aggregation node 113 as shown in FIG. 1, coordinates the pre-agreement on the backup beams. Likewise, the pre-agreement may be updated periodically or by the occurrence of a predefined event, e.g., establishment of connection between UE 112B and AN 111G. The identified backup beams G2 and F2 are mapped into specific downlink and uplink resources and thus the receiver side can recognize the beam failure by monitoring the mapped specific radio link resources.

With reference to FIG. 4, at step S410, UE 112B determines that beam failure for the current serving beam, i.e., beam G1, occurs. Likewise, the determination may be the feedback-based determination as described above. For example, if UE 112B fails to receive a follow-up DL signaling after an UL transmission, e.g., an ACK/NACK feedback, it determines the beam failure for beam G1 occurs.

Then at step S420, UE 112B initiates multiple transmission e.g., by sending a backup beam activation command via uplinks associated with both of the serving and backup beams, i.e., beams G2 and F2. The backup beam activation command may be in the form of a SR.

The serving and neighboring nodes, i.e., AN 111G and AN 111F, keep on monitoring the mapped specific uplink resources, e.g., the SR resources. Assuming that beam F2 is designated as a primary backup beam for beam G1, or the radio link quality for beam F2 is superior to G2, or beams failure for beam G2 also occurs. Thus, with the inter-AN coordination by the cluster head, beam F2 is selected as the new serving beam. As a result, at step S430, the neighboring node returns a UL grant to UE 112B to confirm the activation of the backup beam, i.e., beam F2. Then at step S440, AN 111F and UE 112B start to communicate with each other.

At step S450, with the inter-AN coordination by the cluster head, the serving node notifies the neighboring node of the deactivation of beam G1, which was previously taken as the serving beam. Afterwards, at step S460, the neighboring node transmits DL signaling, e.g., a beam deactivation command to UE 112B to confirm the deactivation of previous serving beam G1.

In the above embodiment, a third node such as a cluster head participates in the inter-AN coordination. As described above, however, the inter-AN coordination may be performed directly between the serving node and the neighboring node.

Figure 5:
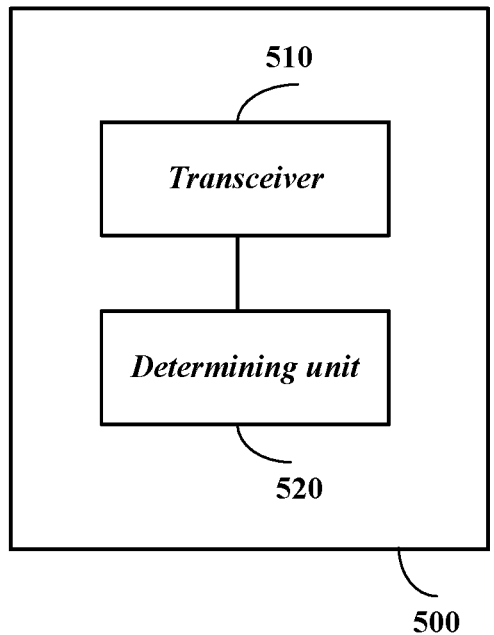
FIG. 5 is a block diagram illustrating a user equipment (UE) having recovery capability from beam failure according to another exemplary embodiment of the present invention.

FIG. 5 is a block diagram illustrating a user equipment (UE) having recovery capability from beam failure according to another exemplary embodiment of the present invention. For illustrative purpose, the present embodiment is described in the context of the UDN architecture as discussed with reference to FIG. 1. However, one skilled artisan in the art would recognize that the present invention is applicable to other wireless access networks. Moreover, one skilled artisan will recognize that the aspects of the present invention as described above are applicable to the present exemplary embodiment.

With reference to FIG. 5, in the present embodiment, a UE 500 comprises a transceiver 510 and a determining unit 520 coupled to each other.

The transceiver 510 is configured to interact with one or more ANs in a wireless access network, e.g., ANs 111A-111G in UDN 110 as shown in FIG. 1. For example, the transceiver 510 is able to communicate or interact with AN 111E via beams E1, E2 and E4. Assuming beam E1 is selected as a current serving beam and beams E2 and E4 are selected as backup beams. As an example, the transceiver 510 transmits a service request or a random access request on an uplink associated with beam E1 and waits for a response responding to the service request or the random access request on a downlink associated with beam E1. Meanwhile, the transceiver 510 monitors the mapped specific radio link resources associated with beams E2 and E4.

The determining unit 520 is configured to determine whether beam failure for the current serving beam, i.e., beam E1, occurs. The determination may be the feedback-based determination as described above. If the determining unit 520 determines that the beam failure occurs, the determining unit 520 instructs the transceiver 510 to transmit notification of the occurrence of the beam failure to AN 111E via uplinks associated with the current serving beam E1 and the backup beams E2 and E4. Alternatively, the notification may be transmitted only via uplinks associated with the backup beams E2 and E4.

When the transceiver 510 receives from AN 111E information on the selection of the available beam or the new serving beam, e.g., beam E2, the determining unit 520 will instruct the transceiver 510 to continue the communication or interaction with AN 111E via the new serving beam. Note that the information may be sent via downlinks associated with the new serving beam only, or associated with all of the beams linked to the mapped specific radio link resources.

Note that in case the backup beams involve with multiple ANs, the determining unit 520 is further configured to instruct the transceiver 510 to transmit the notification to all involved ANs, and the transceiver 510 is configured to communicate or interact with the wireless access network via the new serving beam selected with an inter-AN coordination.

Figure 6:
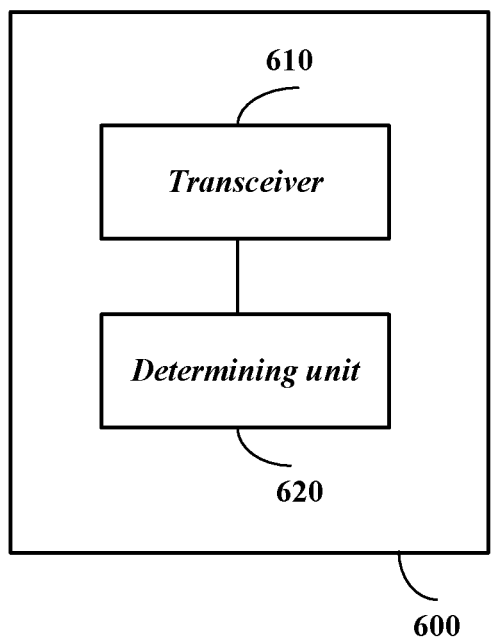
FIG. 6 is a block diagram illustrating an access node (AN) having recovery capability from beam failure according to another exemplary embodiment of the present invention.

FIG. 6 is a block diagram illustrating an access node (AN) having recovery capability from beam failure according to another exemplary embodiment of the present invention. For illustrative purpose, the present embodiment is described in the context of the UDN architecture as discussed with reference to FIG. 1. However, one skilled artisan in the art would recognize that the present invention is applicable to other wireless access networks. Moreover, one skilled artisan will recognize that the aspects of the present invention as described above are applicable to the present exemplary embodiment.

With reference to FIG. 6, in the present embodiment, an AN 600, e.g., anyone of ANs 111A-111G as shown in FIG. 1, comprises a transceiver 610 and a determining unit 620 coupled to each other.

The transceiver 610 is configured to interact with a UE, e.g., UE 112A or 112B as shown in FIG. 1, and other ANs in a wireless access network, e.g., UDN 110 as shown in FIG. 1. For example, the transceiver 610, e.g., in AN 111G, is able to interact with UE 112B via beams G1 and G2, and is connected to AN 111F directly or via a third node(s). Assuming beam G1 is selected as a current serving beam and beams G2 and F2 are selected as backup beams. As an example, the transceiver 610, e.g., in AN 111G transmits a data message or a grant message on a downlink associated with beam G1, and then waits for an acknowledgement (ACK) message or a negative acknowledgement (NACK) message to the data message, or a data message to the grant message on a downlink associated with beam G1. Meanwhile, with a pre-agreement, the transceivers 610, e.g., in AN 111G and AN 111F monitor the mapped specific radio link resources associated with beams G2 and F2, respectively.

The determining unit 620, e.g., in AN 111G is configured to determine whether beam failure for the current serving beam, i.e., beam G1, occurs. The determination may also be also the feedback-based determination as described above. If the determining unit 620 determines that the beam failure occurs, in AN 111G, the determining unit 620 instructs the transceiver 610 to transmit notification of the occurrence of the beam failure to UE 112B via uplinks associated with the current serving beam G1 and the backup beam G2. Moreover, with an inter-AN coordination, the transceiver 610 in AN 111F transmits the notification to UE 112B via an uplink associated with beam F2. Alternatively, the notification may be transmitted only via uplinks associated with the backup beams G2 and F2.

Assuming beam F2 is the primary backup beam as designated or is selected as a new serving beam by UE 112B. Thus, UE 112B will send information on the new serving beam, e.g., beam F2. At AN 111F, if the transceiver 610 receives the information from UE 112B, the determining unit 620 will instruct the transceiver 610 to communicate or interact with UE 112B via the new serving beam.

In the exemplary embodiment described with reference to FIGS. 5 and 6, the determining unit can be implemented as a processor or part of the processor to perform various tasks as discussed above. The processor can include a microprocessor, microcontroller, processor module or subsystem, programmable integrated circuit, programmable gate array, or another control or computing device.

It should be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

What is claimed is:

1. A user equipment (UE), the UE comprising:
    transceiver circuitry configured for communicating with a wireless access network; and
    processing circuitry operatively associated with the transceiver circuitry and configured to:
        communicate with the wireless access network via the transceiver circuitry, using a serving beam;
        identify one or more backup beams for the serving beam;
        map the identified one or more backup beams into specific radio link resources;
        recognize a serving-beam failure by monitoring the mapped specific radio link resources; and
        responsive to the recognition of the serving-beam failure, communicate with the wireless access network on a new serving beam, the new serving beam being selected by the UE or the wireless access network on the basis of current load distribution around the UE, wherein the new serving beam is a predesignated backup beam or another beam selected from a set of candidate beams that includes the serving beam and the one or more backup beams.

2. The UE according to claim 1, wherein the processing circuitry is further configured to detect use, by the wireless access network, of radio link resources associated with the predesignated backup beam to communicate with the UE by monitoring the associated radio link resources for reception of control signaling or data from the wireless access network.

3. The UE according to claim 1, wherein the processing circuitry is configured to select the new serving beam further based on measurements, by the UE, of radio link qualities associated with respective beams in the set of candidate beams.

4. The UE according to claim 1, wherein the processing circuitry is further configured to report measurements, by the UE, of radio link qualities for respective beams in the set of candidate beams and receive signaling from the wireless access network that indicates the new serving beam, the signaling being received on at least one of the serving beam and the predesignated backup beam.

5. An access node (AN) configured for operation in a wireless access network, the AN comprising:
    transceiver circuitry configured for communicating with a user equipment (UE); and
    processing circuitry operatively associated with the transceiver circuitry and configured to:
        communicate with the UE via the transceiver circuitry, using a serving beam;
        identify one or more backup beams for the serving beam;
        map the identified one or more backup beams into specific radio link resources;
        recognize a serving-beam failure by monitoring the mapped specific radio link resources; and
        responsive to recoginition of the serving-beam failure, communicate with the UE on a new serving beam, if the new serving beam is associated with the AN, or transfer communication with the UE to another AN in the wireless access network, if the new serving beam is associated with the other AN, the new serving beam being selected by the UE or the wireless access network on the basis of current load distribution around the UE, wherein the new serving beam is a predesignated backup beam or another beam selected from a set of candidate beams that includes the serving beam and the one or more backup beams.

6. The AN according to claim 5, wherein the processing circuitry is further configured to detect use, by the UE, of radio link resources associated with the predesignated backup beam to communicate with the wireless access network by monitoring the associated radio link resources if the predesignated backup beam is associated with the AN, or by communicating with the other AN, if the predesignated backup beam is associated with the other AN.

7. A method performed by an access node (AN) of a wireless access network, the method comprising:
communicating with a user equipment (UE) via a transceiver circuitry, using a serving beam;
identifying one or more backup beams for the serving beam;
mapping the identified one or more backup beams into specific radio link resources;
recognizing a serving-beam failure by monitoring the mapped specific radio link resources; and
responsive to recognizing the serving-beam failure, communicating with the UE on a new serving beam, if the new serving beam is associated with the AN, or transferring communication with the UE to another AN in the wireless access network, if the new serving beam is associated with the other AN, the new serving beam being selected by the UE or the wireless access network on the basis of current load distribution around the UE, wherein the new serving beam is a predesignated backup beam or another beam selected from a set of candidate beams that includes the serving beam and the one or more backup beams.

8. The method according to claim 7, wherein the method further comprises detecting use, by the UE, of radio link resources associated with the predesignated backup beam to communicate with the wireless access network by monitoring the associated radio link resources if the predesignated backup beam is associated with the AN, or communicating with the other AN, if the predesignated backup beam is associated with the other AN.

9. The method according to claim 7, further comprising receiving information on the selection of the new serving beam from the UE.

10. A method performed by a user equipment (UE) configured for communicating with a wireless access network, the method comprising:
communicating with the wireless access network, using a serving beam;
identifying one or more backup beams for the serving beam;
mapping the identified one or more backup beams into specific radio link resources;
recognizing a serving-beam failure by monitoring the mapped specific radio link resources; and
responsive to recognizing the serving-beam failure, communicating with the wireless access network on a new serving beam, the new serving beam being selected by the UE or the wireless access network on the basis of current load distribution around the UE, wherein the new serving beam is a predesignated backup beam or another beam selected from a set of candidate beams that includes the serving beam and the one or more backup beams.

11. The method according to claim 10, wherein recognizing the serving-beam failure further comprises monitoring radio link resources, associated with the predesignated backup beam, for reception of control signaling or data from the wireless access network.

12. The method according to claim 10, further comprising selecting the new serving beam further based on measurements, by the UE, of radio link qualities associated with respective beams in the set of candidate beams.

13. The method according to claim 10, further comprising reporting measurements, by the UE, of radio link qualities associated with respective beams in the set of candidate beams and receiving a return indication, from the wireless access network, of the new serving beam.

14. A method of operation in a wireless access network, the method comprising:
at a first access node (AN) of the wireless access network:
recognizing a serving-beam failure for a serving beam used by the first AN for communicating with a user equipment (UE); and
indicating the serving-beam failure to a second AN of the wireless access network, the second AN being associated with a predesignated backup beam; and
at the second AN, in response to the first AN indicating the serving-beam failure to the second AN, indicating the serving-beam failure to the UE by communicating with the UE on radio link resources associated with the predesignated backup beam,
wherein the serving beam and the predesignated backup beam belong to a set of candidate beams for serving the UE.

* * * * *